(12) United States Patent
Drossel et al.

(10) Patent No.: US 12,331,724 B2
(45) Date of Patent: Jun. 17, 2025

(54) METHOD FOR OPERATING A WIND TURBINE AND WIND TURBINE

(71) Applicant: Nordex Energy SE & Co. KG, Hamburg (DE)

(72) Inventors: Detlef Drossel, Norderstedt (DE); Björn Phan-Graebitz, Hamburg (DE); Sarah Müller, Hungenroth (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/622,527

(22) Filed: Mar. 29, 2024

(65) Prior Publication Data
US 2024/0337247 A1 Oct. 10, 2024

(30) Foreign Application Priority Data
Apr. 4, 2023 (EP) ..................................... 23166531

(51) Int. Cl.
*F03D 7/02* (2006.01)

(52) U.S. Cl.
CPC ......... *F03D 7/0264* (2013.01); *F03D 7/0224* (2013.01); *F03D 7/0276* (2013.01);
(Continued)

(58) Field of Classification Search
CPC ............................ F03D 7/0276; F03D 7/0264
See application file for complete search history.

(56) References Cited

U.S. PATENT DOCUMENTS

| 5,183,383 A * | 2/1993 | Baas ........................ F03D 9/25 416/9 |
| 7,476,985 B2 * | 1/2009 | Llorente Gonzalez ..................... F03D 7/0264 290/44 |

(Continued)

FOREIGN PATENT DOCUMENTS

| EP | 2 447 529 A1 | 5/2012 |
| EP | 1 573 199 B1 | 2/2013 |

(Continued)

OTHER PUBLICATIONS

Extended European Search Report of the European Patent Office dated Sep. 11, 2023 in EP23166531.6 on which this application is based.

*Primary Examiner* — Michael L Sehn
(74) *Attorney, Agent, or Firm* — Walter Ottesen, P.A.

(57) ABSTRACT

The method is for operating a wind turbine having a wind turbine component and a setting system for executing at least two different measures for reducing the likelihood of overloading the component. First trigger information is provided, which is representative of whether the likelihood of overloading the wind turbine component exceeds a first threshold. If this is the case, a first output signal is generated which is configured to cause the setting system to execute a first measure for reducing the likelihood of overloading the wind turbine component. Second trigger information is provided which is representative of whether the likelihood of overloading the wind turbine component exceeds a second threshold after the first measure was executed. If so, a second output signal is generated which is configured to cause the setting system to execute a second measure for reducing the likelihood of overloading the wind turbine component.

15 Claims, 5 Drawing Sheets

(52) U.S. Cl.
CPC .... *F03D 7/0292* (2013.01); *F05B 2270/1095* (2013.01); *F05B 2270/32* (2013.01); *F05B 2270/328* (2013.01); *F05B 2270/331* (2013.01); *F05B 2270/335* (2013.01); *F05B 2270/808* (2013.01)

(56) References Cited

U.S. PATENT DOCUMENTS

| | | | |
|---|---|---|---|
| 8,240,991 B2 * | 8/2012 | Boerlage | F03D 7/04 416/61 |
| 10,677,220 B2 | 6/2020 | Baba et al. | |
| 2006/0034692 A1 | 2/2006 | Grabau | |
| 2011/0042950 A1 | 2/2011 | Mizoue et al. | |
| 2013/0264823 A1 | 10/2013 | Christiansen et al. | |
| 2014/0028024 A1 | 1/2014 | Garcia Barace et al. | |
| 2014/0091572 A1 | 4/2014 | Jepsen | |
| 2014/0241878 A1 | 8/2014 | Herrig et al. | |
| 2015/0093242 A1 | 4/2015 | Enevoldsen | |
| 2015/0345467 A1 | 12/2015 | Kramer | |
| 2021/0115897 A1 | 4/2021 | Landa et al. | |
| 2022/0056882 A1 | 2/2022 | Von Mutius | |
| 2023/0003199 A1 | 1/2023 | Arroyo Beltri et al. | |
| 2023/0235725 A1 | 7/2023 | Johansen et al. | |
| 2023/0243342 A1 | 8/2023 | Pinto Frutuoso et al. | |
| 2023/0258154 A1 | 8/2023 | Hong et al. | |
| 2023/0265829 A1 | 8/2023 | Grunnet et al. | |

FOREIGN PATENT DOCUMENTS

| | | |
|---|---|---|
| EP | 2 559 894 A1 | 2/2013 |
| EP | 2 647 838 A1 | 10/2013 |
| EP | 2 685 092 A2 | 1/2014 |
| EP | 2 772 643 A2 | 9/2014 |
| EP | 2 556 246 B1 | 1/2015 |
| EP | 2 857 677 A1 | 4/2015 |
| EP | 3 421 784 A1 | 1/2019 |
| WO | 2013/032135 A1 | 3/2013 |
| WO | 2020/238693 A1 | 12/2020 |
| WO | 2021/254573 A1 | 12/2021 |
| WO | 2021/254575 A1 | 12/2021 |
| WO | 2022/008016 A1 | 1/2022 |
| WO | 2022/015729 A1 | 1/2022 |

* cited by examiner

METHOD FOR OPERATING A WIND TURBINE AND WIND TURBINE

CROSS-REFERENCE TO RELATED APPLICATIONS

This application claims priority of European patent application no. 23166531.6, filed Apr. 4, 2023, the entire content of which is incorporated herein by reference.

TECHNICAL FIELD

The present disclosure relates to a method for operating a wind turbine. Furthermore, the present disclosure relates to a computer program, a computer-readable data carrier, a control device, a control system and a wind turbine.

BACKGROUND

Wind turbines are widely known and are used to convert wind energy into electrical energy. The lengths of the rotor blades used in such wind turbines have increased in recent years. For example, vibrations and/or stall of the rotor blades increase the risk of overloading wind turbine components, in particular wind turbine structural components such as the rotor blades, the pitch bearings, the rotor hub, the drive train, the machine frame, the yaw bearing and/or the tower. This leads to a risk of structural damage of the wind turbine components.

SUMMARY

It is an object of the disclosure to provide an improved method for operating a wind turbine, for example a method which increases the lifetime of wind turbine components. Further objects to be achieved are to provide a computer program, a computer-readable data carrier, a control device and a control system for providing such a method, as well as a wind turbine with which this method can be executed.

First, a method for operating a wind turbine is specified.

According to an embodiment, the method is for operating a wind turbine having at least one wind turbine component and a setting system which is configured to execute at least two different measures for reducing the likelihood of overloading at least one wind turbine component. The method includes a step in which first trigger information is provided, wherein the first trigger information is representative of whether the likelihood of overloading at least one wind turbine component exceeds a first threshold. If this is the case, that is, if the first trigger information is representative of the likelihood of overloading at least one wind turbine component to exceed the first threshold, a first output signal is generated which is configured to cause the setting system to execute a first measure for reducing the likelihood of overloading at least one wind turbine component. In a further step, a second trigger information is provided which is representative of whether the likelihood of overloading at least one wind turbine component exceeds a second threshold after the first measure has been executed. If this is the case, that is, if the second trigger information is representative of the likelihood of overloading at least one wind turbine component to exceed the second threshold after the first measure has been executed, a second output signal is generated which is configured to cause the setting system to execute a second measure for reducing the likelihood of overloading at least one wind turbine component.

The present disclosure is, inter alia, based on the recognition that stall at and/or torsional movements/vibrations of the rotor blades increase the likelihood of overloading wind turbine components, in particular structural wind turbine components. Therefore, countermeasures are executed in order to reduce stall and/or torsional movements/vibrations of the rotor blades, thus reducing the likelihood of overloading wind turbine components. Here, the counter measures are applied stepwise in order to reduce the likelihood of overloading wind turbine components while mitigating the negative impact on the operation of the wind turbine in terms of power production. Therefore, compared to a situation in which the wind turbine would apply a single radical countermeasure, for example by directly shutting down the wind turbine, the present disclosure enables to extract more power output out of the wind turbine.

The method specified herein is, in particular, a computer implemented method, that is, is performed by a computer or a processor.

The wind turbine may include a rotor with one or more rotor blades. The at least one wind turbine component is, in particular, at least one structural wind turbine component. The at least one wind turbine component may, for example, be a rotor blade, a pitch bearing, a rotor hub, a drive train component such as a rotor shaft, a machine frame, a yaw bearing and/or a tower of the wind turbine. The wind turbine components, in particular the structural wind turbine components, are subject to loads during operation of the wind turbine. The method specified herein enables a reduction of the likelihood of overloading the wind turbine components.

The method is performed on a wind turbine with a setting system which is configured to execute at least two different measures for reducing the likelihood of overloading at least one wind turbine component. The two different measures are, in particular, conceptually different, that is, they change different properties of the wind turbine.

Herein, when information is representative of a certain quantity or certain quantities, this means that the quantity or quantities can be extracted from the information, either directly, or the quantity/quantities can at least be derived from the information. In other words, the quantity/quantities is/are stored in the information, or at least data are stored in the information, from which the quantity/quantities can be derived or determined or calculated, respectively. Furthermore, here and in the following, information is, in particular, electronic information, like electronic data.

The first trigger information is representative of whether the likelihood of overloading at least one wind turbine component exceeds a first threshold. This first threshold is, for example, a predetermined threshold. Particularly, the first trigger information is representative of whether the likelihood of overloading at least one wind turbine component exceeds the first threshold while the rotor is rotating. By way of example, the first trigger information is either 0 or 1, with 0 meaning that the first threshold is not exceeded and 1 meaning that the first threshold is exceeded.

The likelihood may be any value between 0 and 1, for example. The likelihood may be determined based on a look-up table, for example. Herein, "likelihood" and "risk" are used as synonyms.

The first trigger information may be determined repeatedly, for example, periodically. For example, the first trigger information is determined with a frequency of at least 1 Hz or at least 10 Hz or at least 100 Hz.

The first trigger information is, in particular, representative of the current situation in the wind turbine. For example, the first trigger information is determined from measurements. The measurements used for determining the first trigger information were taken, for example, at most 1 s or at most 0.1 s before determining the first trigger information.

The first trigger information may be representative of whether the likelihood of overloading some wind turbine component(s) of the wind turbine exceeds a first threshold. That is, for two or more wind turbine components, the likelihood is the likelihood that one or more of the wind turbine components is overloaded. The first trigger information may be representative of whether the likelihood of generally having an overloaded wind turbine due to the overloading of some wind turbine component(s) exceeds the first threshold. For example, the first output signal is generated if the first trigger information is representative of the likelihood of overloading some wind turbine component(s) to exceed the first threshold. Alternatively, the first trigger information may be representative of whether the likelihood of overloading a specific (preselected) wind turbine component or a specific (preselected) subset of wind turbine components exceeds a first threshold, while the likelihood of overloading the remaining wind turbine components may or may not exceed the first threshold. The first output signal is then generated, if the likelihood of overloading the specific component or the specific subset of components exceeds the first threshold.

The first output signal is generated if, particularly only if, the first trigger information is representative of the likelihood of overloading at least one wind turbine component to exceed the first threshold. The first output signal is, in particular, an electric signal which can be transmitted via a wire or wirelessly. The first output signal is configured to cause the setting system to execute a first measure for reducing the likelihood of overloading at least one wind turbine component. That is, the first output signal includes information which can be evaluated by the setting system and can be translated by the setting system into a first measure.

The generation of the first output signal and, optionally, also the execution of the first measure, may be carried out in real time. For example, it is carried out/started within a time interval of 50 ms, 100 ms or 200 ms after the first trigger information has been determined to be representative of the likelihood of overloading at least one wind turbine component to exceed the first threshold.

The second trigger information is representative of whether the likelihood of overloading at least one wind turbine component exceeds a second threshold after the first measure has been executed. This means that the second trigger information represents a moment in time after the moment in time represented by the first trigger information which has caused the first output signal and, particularly, a moment in time after the first measure has been executed.

Moreover, the second trigger information may differ from the first trigger information in that it represents whether a different threshold is exceeded than the threshold used for the first trigger information. In other words, the second threshold may be different, for example, higher or lower, than the first threshold. However, it is also possible that that second threshold is the same as the first threshold.

Besides the different moments in time and, optionally, the different thresholds, the second trigger information may be the same as the first trigger information. Particularly, the second trigger information may be determined in the same way as the first trigger information. All features disclosed for the first trigger information are also disclosed for the second trigger information and vice versa.

The second output signal is generated in the case that the second trigger information is representative of the likelihood of overloading at least one wind turbine component to exceed the second threshold after the first measure has been executed. The second output signal is configured to cause the setting system to execute a second measure for reducing the likelihood of overloading at least one wind turbine component. The second measure is, in particular, conceptually different from the first measure.

The second measure shall, in particular, be executed in the case that the first measure has not led to the desired result, that is, a sufficient reduction of the likelihood of overloading at least one wind turbine component. In order to allow the first measure to develop its effect, the second trigger information may be provided/determined with a sufficient time gap to the execution of the first measure. For example, the second trigger information is provided/determined earliest after at least 3 s or at least 5 s or at least 10 s after the first output signal has been generated and/or after the first measure has been executed.

Like for the first output signal, the generation of the second output signal and, optionally, also the execution of the second measure, may be carried out in real time. For example, it is carried out/started within a time interval of at most 50 ms, 100 ms or 200 ms after the second trigger information has been determined to be representative of the likelihood of overloading at least one wind turbine component to exceed the second threshold.

The second measure is, for example, more aggressive than the first measure. This means, for example, that the second measure is expected to reduce the likelihood of overload more strongly than the first measure. For example, the second measure reduces the electrical power output of the wind turbine more than the first measure.

The herein mentioned overloading of wind turbine components results, inter alia, from torsional movements/vibrations of at least one rotor blade and/or stall at the at least one rotor blade. Thus, torsional movements/vibrations, which may be due to stall or to another source of excitation, can be a good indicator for the increase of likelihood of overloading wind turbine components. Furthermore, an unexpected reduced electrical power output of the wind turbine, which is not compatible with the measured wind speed, which is most of the time due to stall of at least one rotor blade, can also be a good indicator for the increase of likelihood of overloading wind turbine components.

Therefore, the herein described trigger information may be, in particular, representative of whether the torsional movement of the at least one rotor blade exceeds a threshold.

Additionally or alternatively, the herein described trigger information may be representative for whether the difference between an expected electrical power output and the actual electrical power output of the wind turbine and/or the difference between an expected wind speed at the rotor and the actually measured wind speed exceeds a threshold.

Accordingly, the herein described measures may be measures configured to reduce the torsional movement of the at least one rotor blade and/or to reduce stall at the at least one rotor blade. Indeed, a reduction of the torsional movement or the stall reduces the likelihood of overloading the wind turbine component(s).

According to a further embodiment, each of the first measure and the second measure is one, but not the same of: changing, particularly increasing, the pitch angle of the at least one rotor blade of a rotor of the wind turbine; changing, particularly reducing, the speed of rotation of the rotor without stopping the rotation of the rotor; changing, particularly reducing, the electrical power output of the wind turbine; shutting down the wind turbine.

The setting system may include a pitch setting arrangement for setting the pitch angles of the one or more rotor blades. Additionally or alternatively, the setting system may include an electrical power output setting arrangement for setting the electrical power output generated by the wind turbine.

In the case that the wind turbine includes several rotor blades, the pitch angles of all rotor blades may be changed, for example, simultaneously or collectively, respectively.

By way of example, changing the pitch angle includes changing, particularly increasing, the minimum allowed value of the pitch angle. Increasing the minimum allowed pitch angle ensures that the actual pitch angle cannot go below a certain threshold. For example, if the minimum allowed pitch angle is increased from 5° to 8° but the pitch angle setpoint is set to be 10°, then increasing the minimum allowed pitch angle would not change the actual pitch angle.

For instance, changing the electrical power output includes changing the power output setting value at the main converter. In particular, the maximum value of electrical power output is changed (decreased). The main converter then influences the torque of the drive train.

According to at least one embodiment, the first trigger information is representative of whether the likelihood of overloading at least one wind turbine component exceeds, besides the first threshold, a critical threshold. That is, the critical threshold is greater than the first threshold. If the critical threshold is also exceeded, the first measure is shutting down the wind turbine. In this case, the step of providing the second trigger information and the herein specified subsequent steps are not executed, for example. By way of example, the step of providing the second trigger information is only executed if the first trigger information was/is representative of the likelihood of overloading the at least one wind turbine component to exceed the first threshold but to be below the critical threshold.

According to a further embodiment, the method includes a further step of providing third trigger information which is representative of whether the likelihood of overloading at least one wind turbine component exceeds a third threshold after the second measure has been executed.

This means that the third trigger information represents a moment in time after the moments in time represented by the first and the second trigger information which caused the first and second output signals and, particularly, a moment in time after the first and the second measures have been executed.

Moreover, the third trigger information may differ from the first and/or the second trigger information in that it represents whether a different threshold is exceeded than that used for the first and/or the second trigger information. In other words, the third threshold may be different, for example, higher or lower, than the first and/or the second threshold. However, it is also possible that that third threshold is the same as the first and/or the second threshold.

Besides the different moments in time and, optionally, the different thresholds, the third trigger information may be the same as the first and/or the second trigger information. Particularly, the third trigger information may be determined in the same way as the first and the second trigger information. All features disclosed for the first and the second trigger information are therefore also disclosed for the third trigger information and vice versa.

According to a further embodiment, if the third trigger information is representative of the likelihood of overloading at least one wind turbine component to exceed the third threshold, the method includes a further step of generating a third output signal. The third output signal is configured to cause the setting system to execute a third measure for reducing the likelihood of overloading at least one wind turbine component. The third measure may be conceptually different from the first and the second measure.

The third measure shall, in particular, be executed in the case that the first and the second measure have not led to the desired result, that is, a sufficient reduction of the likelihood of overloading at least one wind turbine component. In order to allow the first and the second measure to develop their effects, the third trigger information may be provided/determined with a sufficient time gap to the execution of the second measure. For example, the third trigger information is provided/determined earliest after at least 3 s or at least 5 s or at least 10 s after the second output signal has been generated and/or after the second measure has been executed.

Like for the first and the second output signal, the generation of the third output signal and, optionally, also the execution of the third measure, may be carried out in real time. For example, it is carried out/started within a time interval of 50 ms, 100 ms or 200 ms after the third trigger information has been determined to be representative of the likelihood of overloading at least one wind turbine component to exceed the third threshold.

According to a further embodiment, the third measure is not the same as the first and the second measures and is one of: changing, particularly increasing, the pitch angle of the at least one rotor blade of the rotor of the wind turbine; changing, particularly reducing, the speed of rotation of the rotor without stopping the rotation of the rotor; changing, particularly reducing, the electrical power output of the wind turbine; shutting down the wind turbine.

According to a further embodiment, the first measure is changing, particularly increasing, the pitch angle of the at least one rotor blade.

According to a further embodiment, the second measure is changing, particularly reducing, the speed of rotation of the rotor without stopping the rotation of the rotor and/or changing, particularly reducing, the electrical power output of the wind turbine.

According to a further embodiment, the third measure is shutting down the wind turbine, that is, stopping the rotation of the rotor.

According to a further embodiment, changing the pitch angle of the at least one rotor blade includes adding an offset to a minimum allowed value of the pitch angle of the at least one rotor blade. The pitch angle of the at least one rotor blade, which depends on the operating condition of the wind turbine, in particular on the speed of rotation of the rotor and/or the wind speed, thus has a higher minimum allowed value.

According to a further embodiment, changing the electrical power output of the wind turbine includes subtracting an offset from the maximum allowed value of the electrical power output of the wind turbine. The electrical power output of the wind turbine, which depends on the operating condition of the wind turbine, in particular on the speed of rotation of the rotor and/or the wind speed, thus has a lower maximum allowed value.

According to a further embodiment, the second trigger information is representative of whether the likelihood of overloading at least one wind turbine component falls below the first threshold after the first measure has been executed. If this is the case, that is, if the second trigger information is representative of the likelihood of overloading at least one wind turbine component to fall below the first threshold after the first measure has been executed, a further step is executed in which a fourth output signal is generated which is configured to cause the setting system to execute a fourth measure which is opposite to the first measure.

For example, in the case that the first measure was an increase in the pitch angle of the at least one rotor blade, the fourth measure is a reduction of the pitch angle of the at least one rotor blade and so on. The fourth measure may completely compensate the first measure, that is, the operation of the wind turbine is carried out in the same way as before the first measure was executed. Alternatively, the fourth measure may only partially compensate the first measure so that the wind turbine is operated in a more careful or more conservative mode than before the first measure was executed.

According to a further embodiment, the third trigger information is representative of whether the likelihood of overloading at least one wind turbine component falls below the second threshold after the second measure has been executed. If this is the case, that is, if the third trigger information is representative of the likelihood of overloading at least one wind turbine component to fall below the second threshold after the first measure has been executed, a fifth output signal is generated which is configured to cause the setting system to execute a fifth measure opposite to the second measure.

For example, in the case that the second measure was the reduction of the electrical power output or the shutdown of the wind turbine, the fifth measure is an increase in the electrical power output or a restart of the wind turbine, respectively. The fifth measure may completely compensate the second measure, that is, the operation of the wind turbine is carried out in the same way as before the second measure was executed. Alternatively, the fifth measure may only partially compensate the second measure so that the wind turbine is operated in a more careful or more conservative way than before the second measure was executed.

According to a further embodiment, the method further includes a step of providing a first base information which is representative of the pitch angle of the at least one rotor blade of the rotor of the wind turbine. For example, the first base information is representative of the pitch angle of the at least one rotor blade as a function of time or over time, respectively. In the case of two or more rotor blades, the first base information may be representative of the pitch angle of each of the rotor blades, for example, as a function of time. The first base information is, for example, a measurement signal.

According to a further embodiment, the first trigger information is determined depending on the first base information. Indeed, a detection of a change in the pitch angle, for example, a periodic change of pitch angle, which is not induced on purpose, can be an indication of a torsional movement or torsional vibration of the rotor blade, and, accordingly of a high likelihood of overloading one or more wind turbine components.

According to a further embodiment, the first base information is determined depending on measurements taken with the help of a first sensor system. The first sensor system is configured to measure the pitch angle of the at least one rotor blade.

The first sensor system is, for example, part of the wind turbine. The first sensor system includes, for example, at least one encoder sensor, like an optical encoder sensor or a magnetic encoder sensor. The encoder sensor may be located at the pitch bearing, for example. Additionally or alternatively, the first sensor system may include the motor for changing the pitch angle. The electrical signal generated by the motor can be used to determine the pitch angle.

According to a further embodiment, determining the first and/or the second and/or the third trigger information includes applying at least one filter to the first base information in order to extract an oscillation of the pitch angle of the at least one rotor blade with the torsional eigenfrequency of the at least one rotor blade. The filter may include a bandpass filter. For example, the torsional eigenfrequency is between 5 Hz inclusive and 10 Hz inclusive or between 7 Hz inclusive and 8 Hz inclusive.

According to a further embodiment, determining the first and/or the second and/or the third trigger information includes determining whether an amplitude of the oscillation of the pitch angle with the torsional eigenfrequency exceeds a threshold, herein called "oscillation threshold". For example, if it is determined that the amplitude of the oscillation with the torsional eigenfrequency of at least one rotor blade exceeds the oscillation threshold, the first and/or the second and/or the third trigger information is determined to be representative of the likelihood of overloading at least one wind turbine component to exceed the first, second or third threshold. In particular, after applying the bandpass filter, the resulting absolute value of the extracted signal can be taken and a low pass filter can be applied in order to determine whether the amplitude exceeds the oscillation threshold.

According to a further embodiment, the method further includes providing second base information. The second base information is representative of the torsional bending moment acting on the at least one rotor blade, particularly for the torsional bending moment as a function of time or over time, respectively. In the case of two or more rotor blades, the second base information may be representative of the torsional bending moment acting on each of the rotor blades, for example, as a function of time. The second base information may be a measurement signal.

Bending moments acting on the rotor blade are quantities in a reference frame which rotates together with the rotor blade, herein called "rotating reference frame". Thus, the speed of rotation of the rotating reference frame is the same as the speed of rotation of the rotor blade(s). Three orthogonal bending moments can act on a rotor blade, namely an edgewise bending moment, a flapwise bending moment and the torsional bending moment.

According to a further embodiment, the first and/or the second and/or the third trigger information is determined depending on the second base information. Measuring the torsional bending moment is a direct way to detect torsional blade movements and, accordingly, load on the pitch bearing, for example.

Also here, a filter may be applied to the second base information in order to extract an oscillation of the torsional bending moment with the torsional eigenfrequency. If the amplitude of this filtered signal exceeds a threshold, herein called "torsional bending moment threshold", the first and/or the second and/or the third trigger information may be determined to exceed the first, second or third threshold.

According to a further embodiment, the second base information is determined depending on measurements taken with the help of a second sensor system.

According to a further embodiment, the second sensor system includes one or more strain sensors for measuring the torsional bending moment of the at least one rotor blade. The second sensor system is, for example, part of the wind turbine. The strain sensors are, for example, optical fiber sensors or strain gauge sensors. Each rotor blade may be assigned at least one strain sensor for measuring the torsional bending moment. The strain sensors for measuring the torsional bending moment may, in each case, be located at the blade root. Particularly, the strain sensor for measuring the torsional bending moment is especially configured for detecting the torsional bending moment and/or is especially positioned and/or especially orientated for measuring for detecting the torsional bending moment.

According to a further embodiment, the method includes a step of providing a third base information and/or a step of providing a fourth base information. The third base information is representative of the edgewise bending moment, for example, as a function of time, acting on the at least one rotor blade. The fourth base information is representative of the flapwise bending moment acting on the at least one rotor blade, for example, as a function of time. In the case of two or more rotor blades, the third and the fourth base information may be representative of the edgewise bending moment and the flapwise bending moment acting on each of the rotor blades. The third base information and/or the fourth base information may be measurement signals.

According to a further embodiment, the first and/or the second and/or the third trigger information is determined depending on the third and/or the fourth base information. Using the information about the edgewise and/or flapwise bending moment is an indirect way to detect torsional blade vibrations. Since the rotor blade has properties, which differ from those of an ideal beam, edgewise and/or flapwise bending moments cause blade deformations which also include torsional deformations. This is the so-called "bend twist coupling". Therefore, edgewise and/or flapwise bending moments can be used to determine torsional vibrations or torsional movements, respectively. The benefit of using the edgewise and/or the flapwise bending moments is that already existing strain sensors can be used. No extra strain sensors for detecting the torsional bending moments are needed.

Also in these cases, a filter may be applied to the third and/or fourth base information in order to extract an oscillation of the edgewise or flapwise bending moment with the torsional eigenfrequency. If the amplitude of this filtered signal exceeds a threshold, herein called "edgewise bending moment threshold" or "flapwise bending moment threshold", the first and/or the second and/or the third trigger information may be determined to exceed the first, second or third threshold.

According to a further embodiment, the third base information and/or the fourth base information are determined depending on measurements taken with the help of a third sensor system and/or a fourth sensor system. The third and/or the fourth sensor system may be part of the wind turbine.

According to a further embodiment, the third sensor system includes at least one strain sensor for measuring the edgewise bending moment of the at least one rotor blade. The fourth sensor system may include at least one strain sensor for measuring the flapwise bending moment of the at least one rotor blade. The strain sensors for measuring the edgewise and/or flapwise bending moments are, for example, strain gauge sensors or optical fiber sensors. Each rotor blade may be assigned at least one strain sensor for measuring the edgewise bending moment and/or or at least one strain sensor for measuring the flapwise bending moment. The strain sensors for measuring the flapwise and/or edgewise bending moments may, in each case, be located at the blade root.

According to a further embodiment, the method includes a step of providing a fifth base information which is representative of an angular acceleration of the at least one rotor blade, particularly as a function of time or over time, respectively. In particular, the fifth base information is representative of an angular acceleration of the at least one rotor blade at the tip of the at least one rotor blade. In the case of two or more rotor blades, the fifth base information may be representative of the acceleration of each of the rotor blades. Also this fifth base information may be a measurement signal. The "angular acceleration" is an acceleration in the torsional movement of the blade, that is, around the longitudinal axis of the blade.

According to a further embodiment, the first and/or the second and/or the third trigger information is determined depending on the fifth base information. Also here, as in the previous cases, a filter may be applied to extract an oscillation of the angular acceleration with the torsional eigenfrequency. If the amplitude of this filtered signal exceeds a threshold, herein called "angular acceleration threshold", the first and/or the second and/or the third trigger information may be determined to exceed the first, second or third threshold.

According to a further embodiment, the fifth base information is determined depending on measurements taken with the help of a fifth sensor system. Also the fifth sensor system may be part of the wind turbine.

According to a further embodiment, the fifth sensor system includes at least one acceleration sensor for measuring the angular acceleration of the at least one rotor blade. The acceleration sensor may be a gyroscopic accelerometer. For example, each rotor blade is assigned at least one acceleration sensor. In each case, the acceleration sensor may be located away from the blade root, for example, at the blade tip.

According to a further embodiment, the method includes a step of providing a sixth base information which is representative of an electrical power output of the wind turbine and/or for a wind speed. Also the sixth base information may be a measurement signal.

According to a further embodiment, the first and/or the second and/or the third trigger information is determined depending on the sixth base information. This may include the steps of determining the produced electrical power output of the wind turbine, calculating the expected wind speed based on the measured electrical power output (for example, by using the power curve), and comparing the calculated wind speed with an actually measured wind speed. If this difference exceeds a threshold, herein called "deviation threshold", the first and/or the second and/or the third trigger information is determined to be representative of the likelihood of overloading at least one wind turbine component to exceed the first, second or third threshold.

Alternatively, determining the trigger information depending on theسسsixth base information may include a comparison between a measured electrical power output of the wind turbine and a calculated electrical power output of the wind turbine based on a measured wind speed at the wind turbine. Also here, if the difference between the measured electrical power output and the expected electrical power output exceeds a deviation threshold, the first and/or the second and/or third trigger information may be determined to be representative of the likelihood of overloading at least one wind turbine component to exceed the respective first, second or third threshold.

Indeed, if there is a deviation between the measured wind speed and the calculated wind speed based on the measured power output or a deviation between the measured power output and the calculated power output based on the measured wind speed, it can be an indicator of stall which, in turn, means an increase of the risk/likelihood of overloading.

According to a further embodiment, the sixth base information is determined depending on measurements taken with the help of a sixth sensor system. Also this sixth sensor system may be part of the wind turbine.

According to a further embodiment, the sixth sensor system includes a measurement unit for measuring the electrical power output of the wind turbine and/or a measurement unit for measuring the wind speed at the wind turbine. For example, the sixth sensor system includes at least one voltage sensor and/or at least one current sensor for determining the electrical power output. Additionally or alternatively, the sixth sensor system may include at least one cup-anemometer and/or at least one ultrasonic anemometer for measuring the wind speed.

There is also the possibility to detect stall directly (seventh base information), for example, with the help of a seventh sensor system, and to determine the first, second or third trigger information depending on this detected stall/seventh base information.

Next, the computer program, the computer-readable data carrier and the control device are specified.

According to an embodiment, the computer program includes instructions which, when the program is executed by a computer, cause the computer to carry out the method for operating a wind turbine according to any one of the embodiments described herein.

According to an embodiment, the computer-readable data carrier has the computer program stored thereon.

According to an embodiment, the control device includes at least one processor and/or at least one programmable logic controller, plc for short, configured to perform the method for operating a wind turbine according to any one of the embodiments described herein. The control device may be a computer, for example. The control device may be part of the wind turbine or may be an external device which is, for example, several km away from the wind turbine, like a computer in a control station (remote control). For example, the control device is configured to communicate with the wind turbine or components thereof via a wire or wirelessly.

Next, the control system for operating a wind turbine is specified. The control system is, in particular, configured to perform the method according to any one of the embodiments described herein. Therefore, all features disclosed for the method are also disclosed for the control system and vice versa.

According to an embodiment, the control system is a control system for operating a wind turbine which has at least one wind turbine component and a setting system which is configured to execute at least two different measures for reducing the likelihood of overloading at least one wind turbine component. The control system includes at least one sensor system configured to take measurements with the help of which it is determinable whether the likelihood of overloading at least one wind turbine component exceeds a threshold. The control system further includes the control device as specified herein. The control device is signally connectable or connected to the at least one sensor system in order to provide the control device with the measurements of the at least one sensor system. The control device is signally connectable or connected to the setting system in order to provide the setting system with the first and the second output signal of the control device so that the setting system executes the first and the second measures depending on the first and the second output signals.

For example, the at least one sensor system is signally connectable or is signally connected with the control device via a wire or wirelessly. The at least one sensor system and/or the control device may be part of the wind turbine, that is, may be integrated into the wind turbine, or may be external. The control device may be signally connected or connectable to the setting system via a wire or wirelessly.

The control device may, accordingly, include an interface for receiving data from the at least one sensor system and an interface for sending the output signal to the setting system.

The setting system may be part of the control system. The setting system includes, for example, a pitch setting arrangement and/or an electrical power output setting arrangement. For example, the pitch setting arrangement includes at least one actuator for each of the rotor blades, wherein each actuator is configured to change and/or set the pitch angle of the respective rotor blade. The pitch setting arrangement may be configured to individually or collectively change the pitch angles of the rotor blades. The setting system may operate as an open-loop system (that is, no feedback loop).

According to a further embodiment, the control system includes the first sensor system and/or the second sensor system and/or the third sensor system and/or the fourth sensor system and/or the fifth sensor system and/or the sixth sensor system and/or the seventh sensor system.

Next, the wind turbine is specified.

According to an embodiment, the wind turbine includes at least one wind turbine component, like at least one rotor blade of a rotor of the wind turbine, a setting system which is configured to execute at least two different measures for reducing the likelihood of overloading at least one wind turbine component and the control system according to any one of the embodiments described herein. The setting system of the wind turbine may be the above-defined setting system.

BRIEF DESCRIPTION OF DRAWINGS

The invention will now be described with reference to the drawings wherein.

DETAILED DESCRIPTION

Figure 1:
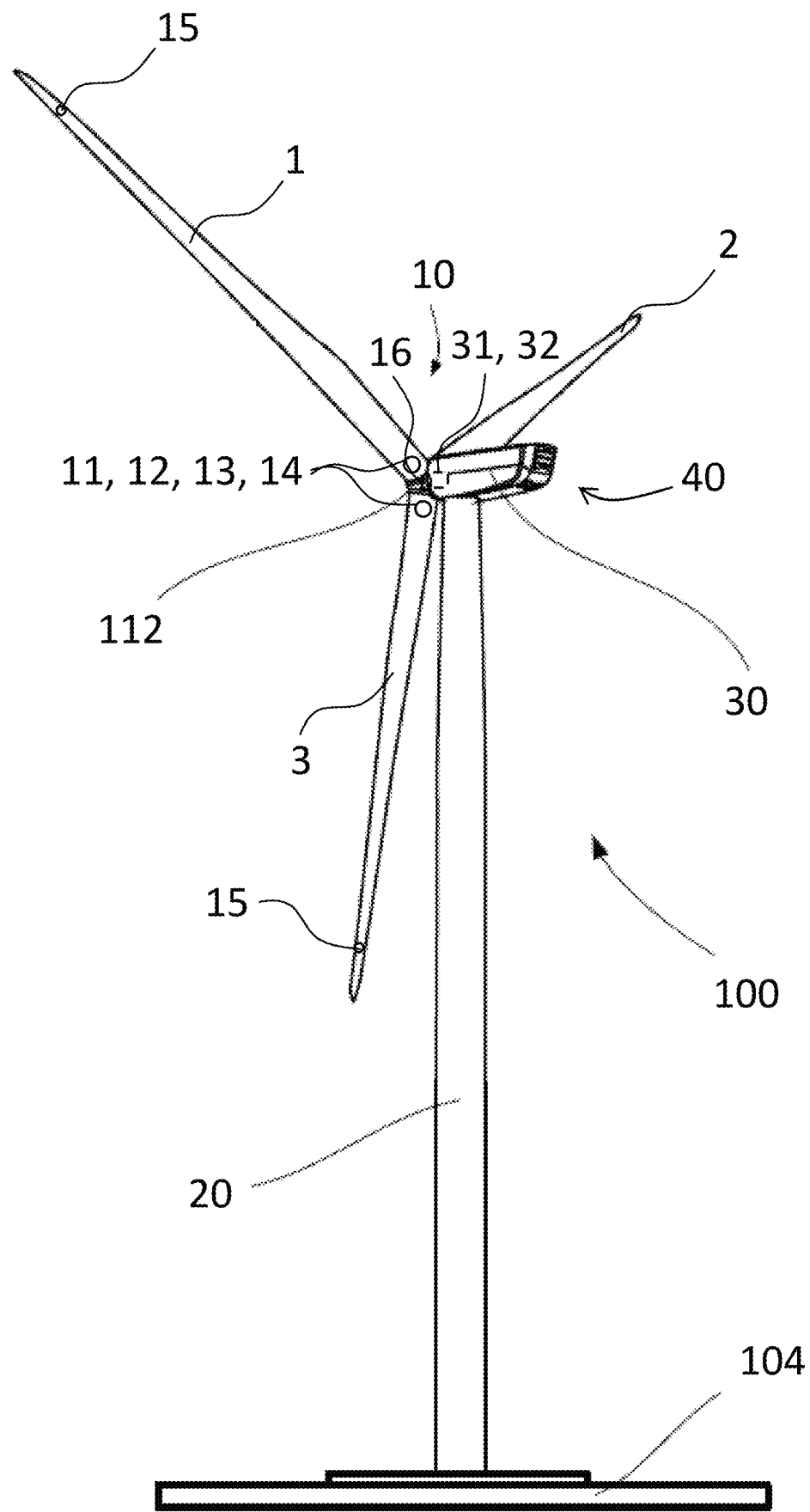
FIG. 1 shows an embodiment of a wind turbine.

FIG. 1 shows a schematic view of an embodiment of a wind turbine 100 which includes a tower 20. The tower 20 is fixed to the ground via a foundation 104. At one end of the tower 20, opposite to the ground, a nacelle is rotatably mounted. The nacelle includes, for example, a generator which is coupled to a rotor 10 via a gearbox (not shown). The rotor 10 includes three (wind turbine) rotor blades 1, 2, 3, which are arranged on a rotor hub 112, the rotor hub 112 being connected to a rotor shaft (not shown).

During operation, the rotor 10 is set in rotation by an air flow, for example wind. This rotational movement is transmitted to the generator via the drive train including, inter alia, the rotor shaft and the gearbox. The generator converts the mechanical energy of the rotor 10 into electrical energy.

In order to control the operation of the wind turbine 100, the wind turbine 100 includes a setting system 31, 32. The setting system 31, 32 includes a pitch setting arrangement 31 which is configured to set the pitch angles $\beta\_1, \beta\_2, \beta\_3, \beta\_i$ for short, of the rotor blades 1, 2, 3. The pitch setting arrangement 31 is configured to set the pitch angle $\beta\_i$ of each rotor blade 1, 2, 3. For example, the pitch setting arrangement 31 includes at least one actuator for each rotor blade 1, 2, 3 via which an electrical signal is translated into a mechanical movement of the respective rotor blade 1, 2, 3 about its longitudinal axis.

The setting system 31, 32 further includes an electrical power output setting arrangement 32 which is configured to change the power output at the main converter of the wind turbine 100. The speed of rotation of the rotor 10 can be changed with the help of the pitch setting arrangement 31 and/or the power output setting arrangement 32.

The wind turbine 100 further includes a control system 40 which is configured to operate the wind turbine 100. The control system 40 includes a first 11, a second 12, a third 13, a fourth 14, a fifth 15 and a sixth 16 sensor system as well as a control device 30.

The first sensor system 11 is configured to measure the pitch angles $\beta\_i$ of the rotor blades 1, 2, 3. For example, the first sensor system 11 includes at least three encoder sensors, like optical or magnetic encoder sensors, wherein each rotor blade 1, 2, 3 is assigned at least one of these encoder sensors. With the help of the encoder sensors, the pitch angle $\beta\_i$ of each rotor blade 1, 2, 3 as a function of time can be determined, for example.

The second sensor system 12 is configured to measure the torsional bending moments $M\_x,1, M\_x,2, M\_x,3, M\_x,i$ for short, acting on the rotor blades 1, 2, 3. The second sensor system 12 includes, for example, at least one strain sensor for each rotor blade 1, 2, 3, wherein the strain sensor is coupled to the respective rotor blade 1, 2, 3. The strain sensors may be fiber optic strain sensors, for example. The measurements of the strain sensors may be used to estimate/determine the torsional bending moment $M\_x,i$ acting on the respective rotor blade 1, 2, 3.

The third 13 and the fourth 14 sensor systems are configured to measure the edgewise bending moments $M\_y,1, M\_y,2, M\_y,3, M\_y,i$ for short, acting on the rotor blades 1, 2, 3 and the flapwise bending moments $M\_z,1, M\_z,2, M\_z,3, M\_z,i$ for short, acting on the rotor blades 1, 2, 3, respectively. The third sensor system 13 includes, for example, at least one strain sensor for each rotor blade 1, 2, 3, wherein the strain sensors are coupled to the respective rotor blade 1, 2, 3. Likewise, the fourth sensor system 14 may include at least one strain sensor for each rotor blade 1, 2, 3, wherein the strain sensors are coupled to the respective rotor blade 1, 2, 3. The strain sensors may be fiber optic strain sensors, for example. The measurements of the strain sensors may be used to estimate/determine the edgewise bending moment $M\_y,i$ and the flapwise bending moment $M\_z,i$ acting on the respective rotor blade 1, 2, 3.

The fifth sensor system 15 is configured to measure the angular accelerations of the rotor blades 1, 2, 3. The fifth sensor system 15 includes, for example, at least one angular acceleration sensor, like a gyroscopic accelerometer, for each rotor blade 1, 2, 3. The acceleration sensor is coupled to the respective rotor blade at the tip end of the rotor blade, for example. The measurements of the angular acceleration sensor may be used to estimate/determine the angular acceleration acting on the respective rotor blade 1, 2, 3.

The sixth sensor system 16 is configured to measure the electrical power output PO of the wind turbine and/or the wind speed WS at the wind turbine. For example, the sixth sensor system 16 includes at least one voltage sensor and/or at least one current sensor for determining the electrical power output. Additionally or alternatively, the sixth sensor system 16 may include at least one cup-anemometer and/or at least one ultrasonic anemometer for measuring the wind speed.

The measurements of the different sensor systems 11 to 16 may be used individually or collectively in order to determine trigger information as will be further explained below.

The control device 30 of the wind turbine 100 includes, for example, at least one processor. It may be located in the nacelle. The control device 30 is signally coupled to the sensor systems 11 to 16 and the setting system 31, 32 so that it can communicate with the systems 11 to 16, 31, 32. The measurement signals from the sensor systems 11 to 16 are processed by the control device 30 and, depending on this, one or more output signals are possibly transmitted to the setting system 31, 32 in order to adjust the operation of the wind turbine 100.

Figure 2:
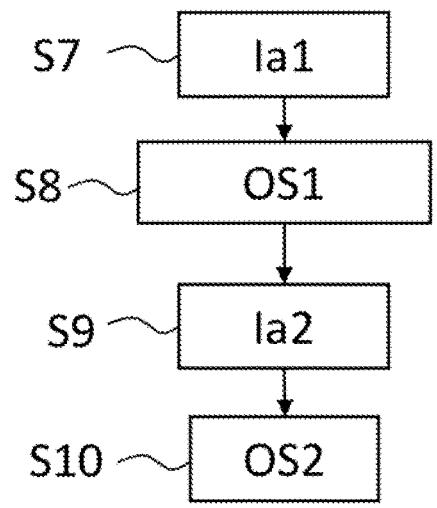
FIGS. 2 to 4 show flowcharts of embodiments of the method for operating a wind turbine.

FIG. 2 shows a first embodiment of the method for operating a wind turbine. In a step S7, a first trigger information Ia1 is provided. The first trigger information Ia1 is representative of whether the likelihood of overloading at least one wind turbine component of the wind turbine 100 exceeds a first threshold. If this is the case, that is, if the first trigger information Ia1 is representative of the likelihood of overloading at least one wind turbine component exceeding the first threshold, a first output signal OS1 is generated in a step S8. The first output signal OS1 is configured to cause the setting system 31, 32 to execute a first measure for reducing the likelihood of overloading at least one wind turbine component. Then, in a step S9, a second trigger information Ia2 is provided. The second trigger information Ia2 is representative of whether the likelihood of overloading at least one wind turbine component exceeds a second threshold after the first measure has been executed. If this is the case, a second output signal OS2 is generated. The second output signal OS2 is configured to cause the setting system 31, 32 to execute a second measure for reducing the likelihood of overloading at least one wind turbine component. The second measure is, in particular, different from the first measure. The first and the second threshold may be the same or may be different.

The wind turbine components which may be overloaded are the three rotor blades 1, 2, 3. For example, when the rotor blades 1, 2, 3 are subject to strong torsional vibrations (high load), they may be structurally damaged. However, the method described herein is not limited to the rotor blades 1, 2, 3. Rather, other wind turbine components are subject to possible overload, like the pitch bearings or the yaw bearing and so on. With the described method, also these wind turbine components can be prevented from overload and damage.

Figure 3:
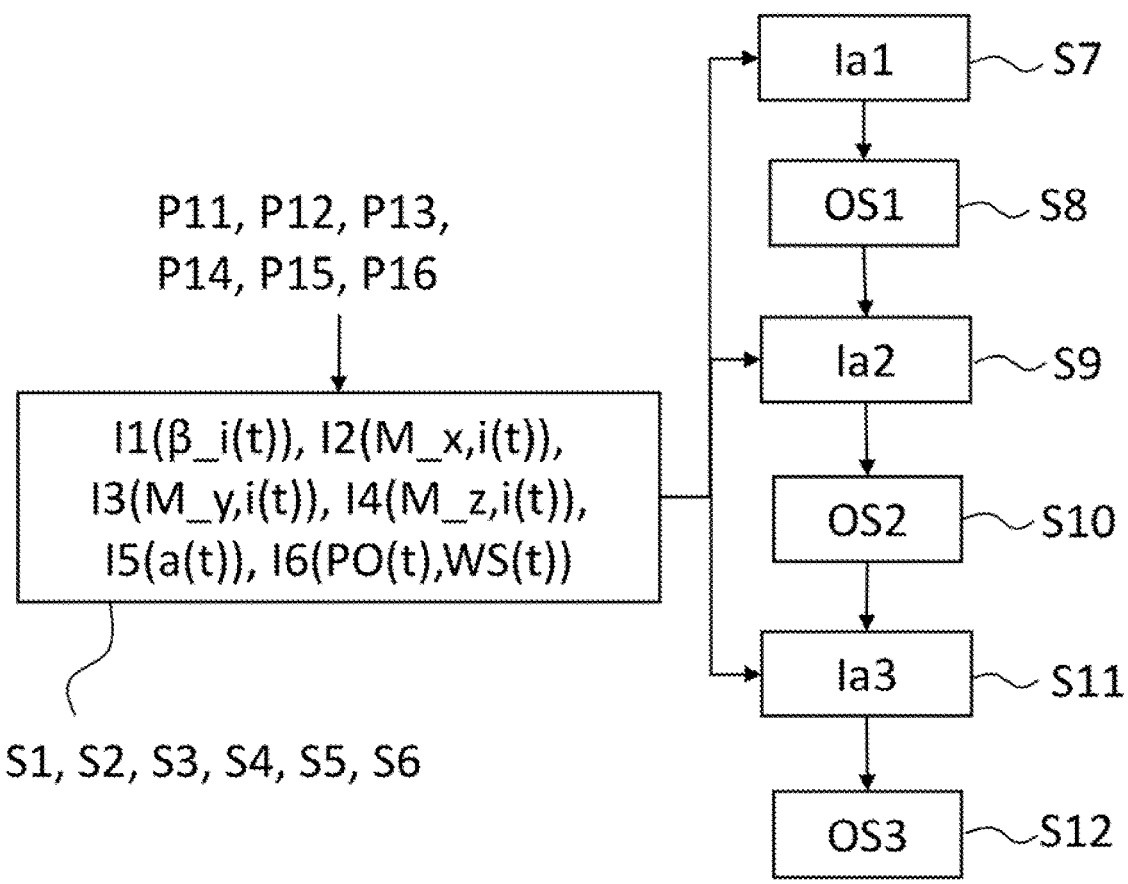

FIG. 3 shows a second embodiment of the method for operating a wind turbine. Here, first I1, second I2, third I3, fourth I4, fifth I5 and sixth I6 base information are provided (steps S1 to S6). The first base information I1 is representative of the pitch angles $\beta\_i$ of the rotor blades 1, 2, 3 as a function of time. The second base information I2, the third base information I3 and the fourth base information I4 are representative of the torsional blade bending moments $M\_x,i$ acting on the rotor blades 1, 2, 3, the edgewise bending moments M_y,i acting on the rotor blades 1, 2, 3 and the flapwise bending moments M_z,i acting on the rotor blades, in each case as a function of time. The fifth base information I5 is representative of the angular accelerations of the rotor blades 1, 2, 3 as a function of time. The sixth base information I6 is representative of the power output PO of the wind turbine and the wind speed WS at the wind turbine.

The first base information I1 is determined depending on measurements P11 taken with the help of the first sensor system 11. The second base information I2 is determined depending on the measurements P12 taken with the help of the second sensor system 12. The third base information I3 is determined depending on the measurements P13 taken with the help of the third sensor system 13. The fourth base information I4 is determined depending on measurements P14 taken with the help of the fourth sensor system 14. The fifth base information I5 is determined depending on measurements P15 taken with the help of the fifth sensor system 15. The sixth base information I6 is determined depending on measurements P16 taken with the help of the sixth sensor system 16.

Depending on the base information I1 to I6, the first trigger information Ia1 being representative of whether the likelihood of overloading at least one wind turbine component exceeds the first threshold is determined (step S7). Indeed, from all of this base information I1 to I6, information about the likelihood of overloading at least one wind turbine component, for example, the rotor blades 1, 2, 3, can be extracted.

If the first trigger information Ia1 is representative of the likelihood of overloading at least one wind turbine component to exceed the first threshold, the first output signal OS1 is generated (step S8). The first output signal OS1 is configured to cause the setting system 31, 32 to execute the first measure. For example, the first measure is a change, particularly an increase, of the pitch angles β_i of the rotor blades 1, 2, 3. For this purpose, the pitch setting arrangement 31 may be used.

In step S9, the second trigger information Ia2 is determined again depending on the base information I1 to I6. However, in this case, the base information I1 to I6 is representative of a later moment in time than the base information I1 to I6 used for determining the first trigger information Ia1 having caused the first output signal OS1.

If the second trigger information Ia2 is representative of the likelihood of overloading at least one wind turbine component exceeding the second threshold, the second output signal OS2 is generated in the step S10. The second output signal OS2 is configured to cause the setting system 31, 32 to execute the second measure. For example, the second measure is a reduction of the electric power output of the wind turbine 100. The second measure may be executed with the help of the power output setting arrangement 32.

In a step S11, third trigger information Ia3 is determined. The third trigger information Ia3 is representative of whether the likelihood of overloading at least one wind turbine component exceeds a third threshold after the second measure has been executed. The third threshold may be the same as the first and/or the second threshold or may be different from the first and/or the second threshold. The third trigger information Ia3 is again determined depending on the base information I1 to I6. However, in this case, the base information I1 to I6 is representative for a later moment in time than the base information I1 to I6 used for determining the second trigger information Ia2 which has caused the second output signal OS2.

If the third trigger information Ia3 is representative of the likelihood of overloading at least one wind turbine component to exceed the third threshold, a step S12 is executed in which a third output signal OS3 is generated. The third output signal OS3 is configured to cause the setting system 31, 32 to execute a third measure for reducing the likelihood of overloading at least one wind turbine component. For example, the third measure shuts down the wind turbine. This may be done with the help of the pitch setting arrangement 31 and/or the power output setting arrangement 32.

In FIG. 3, the trigger information Ia1, Ia2, Ia3 has been determined depending on six different pieces of base information I1 to I6. However, it can be also sufficient to determine the trigger information Ia1, Ia2, Ia3 depending on only one or only a few of these pieces of base information I1 to I6.

Figure 4:
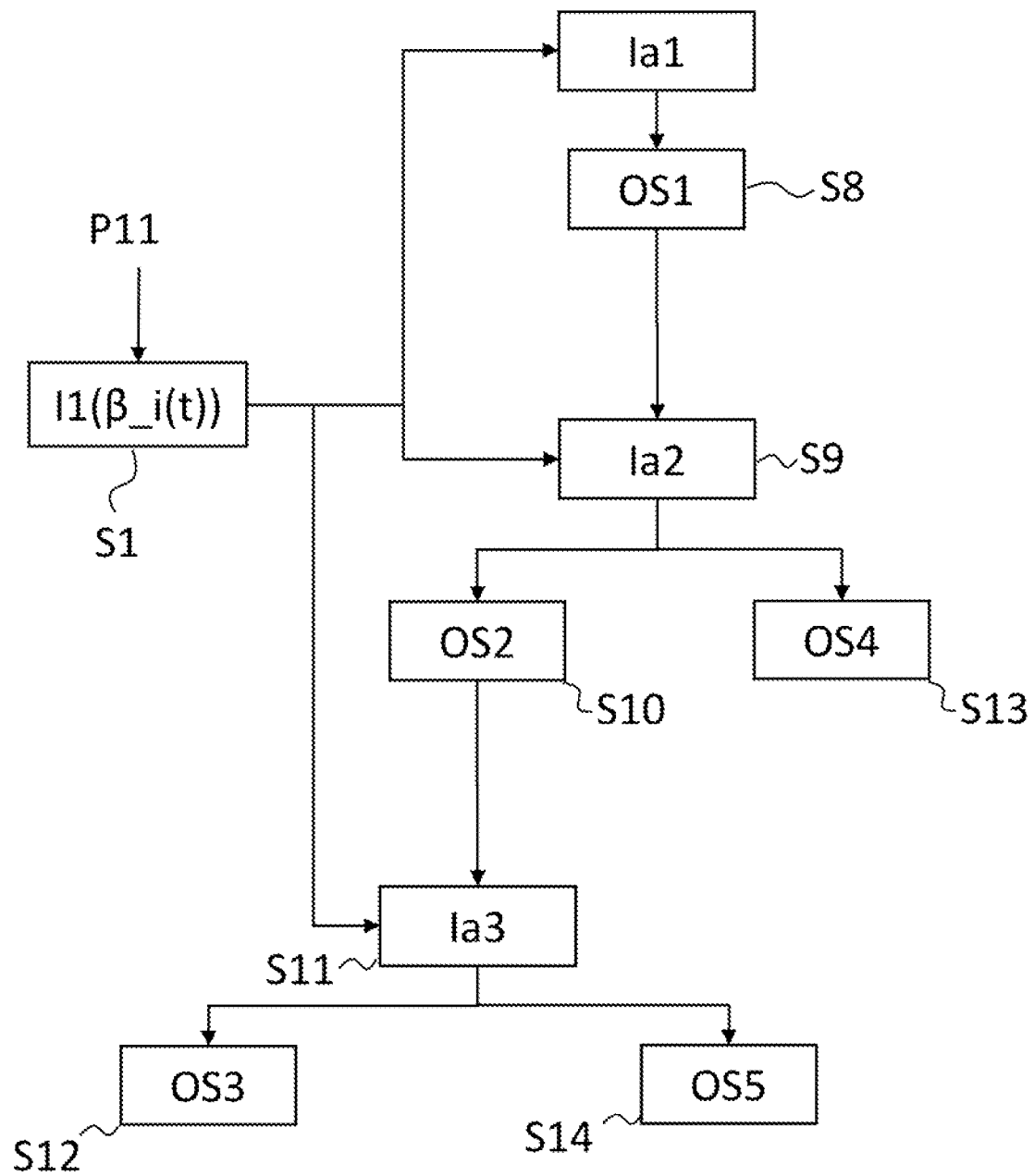

FIG. 4 shows a further embodiment of the method for operating the wind turbine 100. In this case, the first Ia1, the second Ia2 and the third Ia3 trigger information are each exemplarily determined only depending on the first base information I1. However, any other of the second I2 to the sixth I6 base information could be used instead. Here, the second threshold is assumed to be greater than the first threshold and the third threshold is assumed to be greater than the second threshold.

In FIG. 4, the second trigger information Ia2 is also representative of whether the likelihood of overloading at least one wind turbine component falls below the first threshold after the first measure has been executed. If this is the case, a step S13 is executed in which a fourth output signal OS4 is generated which is configured to cause the setting system 31, 32 to execute a fourth measure opposite to the first measure. That is, the fourth measure at least partially cancels the first measure. For example, the fourth measure is a reduction of the pitch angles β_i.

In the case that step S10 is executed, the third trigger information Ia3 is determined. The third trigger information Ia3 is also representative of whether the likelihood of overloading at least one wind turbine component falls below the second threshold after the second measure has been executed. If this is the case, a step S14 is executed in which a fifth output signal OS5 is generated which is configured to cause the setting system 31, 32 to execute a fifth measure opposite to the second measure. That is, the fifth measure at least partially cancels the second measure. For example, the fifth measure is an increase in the electrical power output of the wind turbine.

Figure 5:
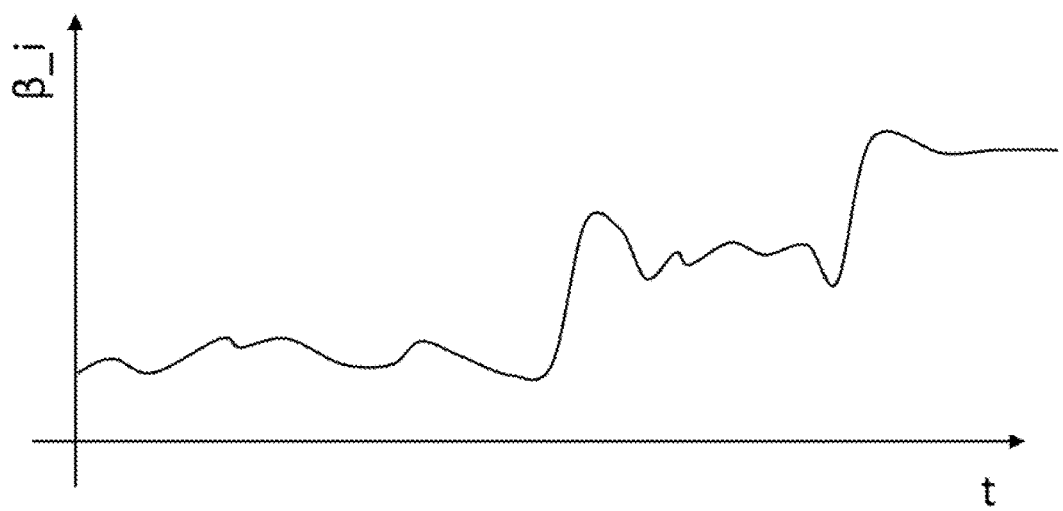
FIGS. 5 to 8 show simulations illustrating the method for operating a wind turbine.

FIG. 5 shows simulations for the pitch angle β_i of one of the rotor blades 1, 2, 3 as a function of time t. For example, FIG. 5 illustrates the first base Information I1 determined with the help of the first sensor system 11. As can be seen, the pitch angle β_i fluctuates strongly over time.

Figure 6:
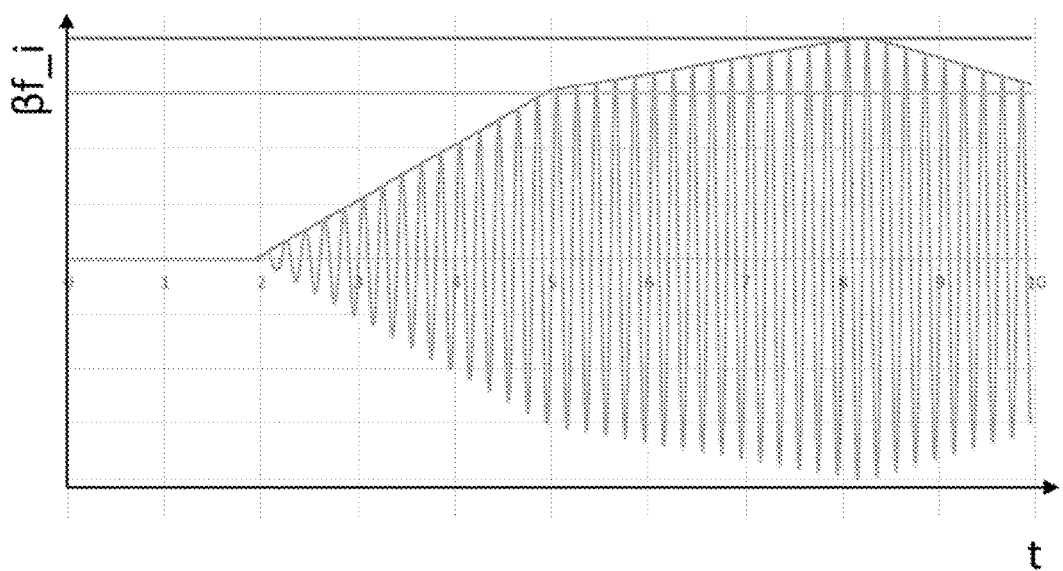

FIG. 6 shows the pitch angle βf_i as a function of time t after the signal of FIG. 5 has been filtered with the help of a bandpass filter. The bandpass filter is chosen such that it extracts an oscillation of the pitch angle β_i of the rotor blade with the torsional eigenfrequency of the rotor blade.

Figure 7:
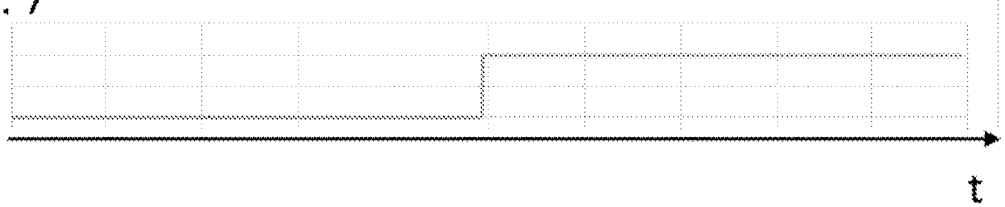

FIG. 6 shows that the amplitude of the oscillation with the torsional eigenfrequency of the rotor blade increases with increasing time. The lower horizontal line shown in FIG. 6 indicates a first oscillation threshold. As soon as the amplitude passes this first oscillation threshold, the first trigger information Ia1 is determined to be representative of the likelihood of overloading at least one wind turbine component, for example, the rotor blade, exceeding the first threshold. Accordingly, the first output signal is generated and the first measure is executed, as indicated in FIG. 7. Here, the first measure is a collective increase of the pitch angles $\beta\_i$ of the rotor blades 1, 2, 3 as also reflected in FIG. 5.

Figure 8:
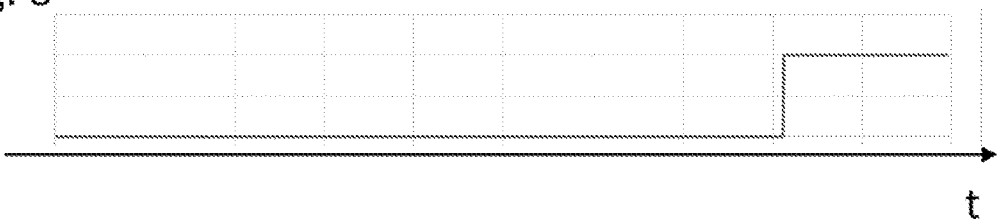

FIG. 6 shows that the execution of the first measure reduces the speed with which the amplitude of the oscillation of the pitch angle $\beta\_i$ increases, but does not result in a decrease of this amplitude. At a later moment in time, the amplitude exceeds a second oscillation threshold (indicated by the further horizontal line). The second trigger information is then determined to be representative of the likelihood of overloading at least one wind turbine component exceeding the second threshold, and, accordingly, the second output signal is generated. The second output signal induces the execution of the second measure. Execution of the second measure (see FIG. 8) finally results in the desired reduction of the amplitude of the pitch angle oscillation (see FIG. 6). The second measure is, for example, the shutdown of the wind turbine.

Figure 9:
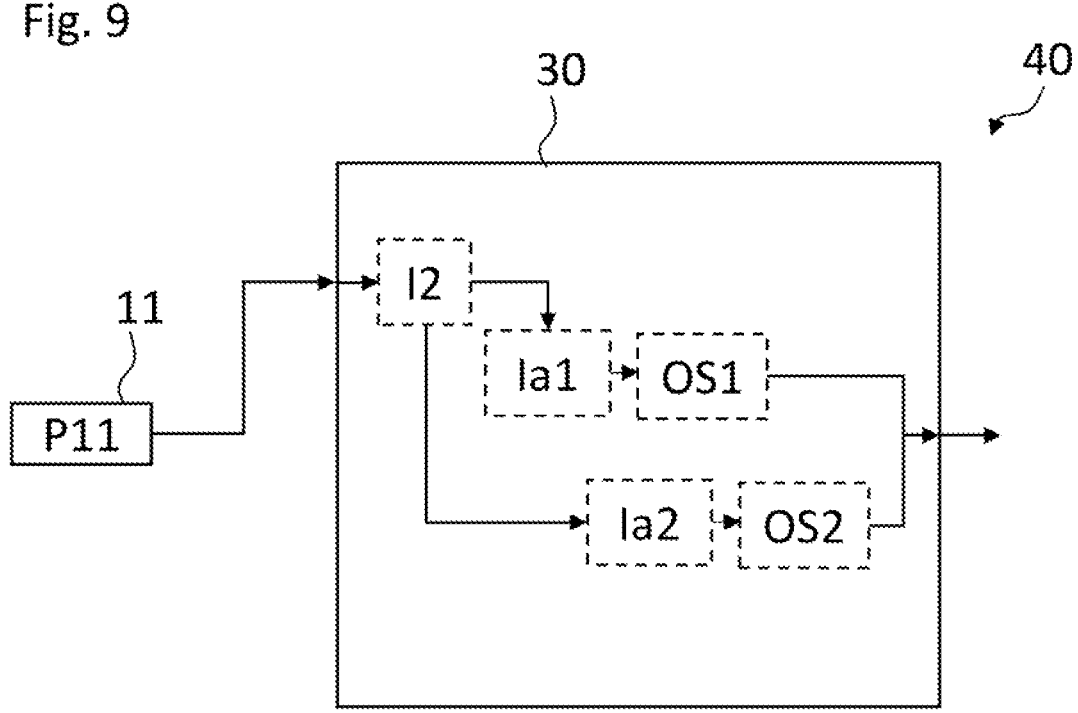
FIG. 9 shows an embodiment of the control system and the control device.

FIG. 9 shows an embodiment of the control system 40. The control system 40 includes the sensor system 11, with which the measurements P11 can be taken. These measurements P11 are provided to the control device 30 which performs the method steps of the method, and, possibly, delivers output signals OS1, OS2, which the control system 40 then transmits to the setting system 31, 32 of the wind turbine 100 in order to adjust the operation.

It is understood that the foregoing description is that of the preferred embodiments of the invention and that various changes and modifications may be made thereto without departing from the spirit and scope of the invention as defined in the appended claims.

REFERENCE SIGNS

1 first rotor blade
2 second rotor blade
3 third rotor blade
10 rotor
11 first sensor system
12 second sensor system
13 third sensor system
14 fourth sensor system
15 fifth sensor system
16 sixth sensor system
20 tower
30 control device
31 pitch setting arrangement
32 power output setting arrangement
40 control system
100 wind turbine
104 foundation
106 nacelle
112 rotor hub
I1 first base information
I2 second base information
I3 third base information
I4 fourth base information
I5 fifth base information
I6 sixth base information
Ia1 first trigger information
Ia2 second trigger information
Ia3 third trigger information
OS1 first output signal
OS2 second output signal
OS3 third output signal
$\beta\_i$ pitch angle
$\beta f\_i$ filtered pitch angle
M_x,i torsional bending moment
M_y,i edgewise bending moment
M_z,i flapwise bending moment
PO electrical power output
WS wind speed
P11 to P16 measurements
S1 to S14 method steps

The invention claimed is:

1. A method for operating a wind turbine having a wind turbine component and a setting system configured to execute at least two different measures for reducing a likelihood of overloading the wind turbine component, the method comprising:
providing first trigger information which is representative of whether the likelihood of overloading the wind turbine component exceeds a first threshold;
generating a first output signal if the likelihood of overloading the wind turbine component exceeds the first threshold, wherein the first output signal is configured to cause the setting system to execute a first measure of the at least two different measures for reducing the likelihood of overloading the wind turbine component;
providing second trigger information which is representative of whether the likelihood of overloading the wind turbine component exceeds a second threshold after the first measure has been executed; and,
generating a second output signal if the likelihood of overloading exceeds the second threshold, wherein the second output signal is configured to cause the setting system to execute a second measure of the at least two different measures for reducing the likelihood of overloading the wind turbine component.

2. The method of claim 1, wherein each of the first measure and the second measure is one of: changing a pitch angle of at least one rotor blade of a rotor of the wind turbine, changing a speed of rotation of the rotor without stopping a rotation of the rotor, changing an electrical power output of the wind turbine, and shutting down the wind turbine; and, the first measure and the second measure differ from each other.

3. The method of claim 1 further comprising:
providing third trigger information which is representative of whether the likelihood of overloading the wind turbine component exceeds a third threshold after the second measure has been executed;
generating a third output signal if the likelihood of overloading exceeds the third threshold, wherein the third output signal is configured to cause the setting system to execute a third measure for reducing the likelihood of overloading the wind turbine component; and,
wherein the third measure is different than the first measure and the second measure and is one of: changing a pitch angle of at least one rotor blade of a rotor of the wind turbine, changing a speed of rotation of the rotor without stopping a rotation of the rotor, changing an electrical power output of the wind turbine, and shutting down the wind turbine.

4. The method of claim 3, wherein:
the first measure is changing the pitch angle of the at least one rotor blade;
the second measure is at least one of changing the speed of rotation of the rotor without stopping the rotation of the rotor and changing the electrical power output of the wind turbine; and, the third measure is shutting down the wind turbine.

5. The method of claim 3, wherein at least one of:
changing the pitch angle of the at least one rotor blade includes adding an offset to a minimum allowed value of the pitch angle of the at least one rotor blade; and, changing the electrical power output of the wind turbine includes subtracting an offset from a maximum allowed value of the electrical power output of the wind turbine.

6. The method of claim 3, wherein the third trigger information is representative of whether the likelihood of overloading the wind turbine component falls below the second threshold after the second measure has been executed, the method further comprising:
generating a fifth output signal if the likelihood of overloading the wind turbine component falls below the second threshold after the second measure has been executed, wherein the fifth output signal is configured to cause the setting system to execute a fifth measure opposite to the second measure.

7. The method of claim 1, wherein the second trigger information is representative of whether the likelihood of overloading the wind turbine component falls below the first threshold after the first measure has been executed, the method further comprising:
generating a fourth output signal if the likelihood of overloading the wind turbine component falls below the first threshold after the first measure has been executed, wherein the fourth output signal is configured to cause the setting system to execute a fourth measure opposite to the first measure.

8. The method of claim 1 further comprising providing at least one of:
a first base information which is representative for a pitch angle of at least one rotor blade of a rotor of the wind turbine,
a second base information which is representative for a torsional bending moment acting on the at least one rotor blade,
a third base information which is representative for an edgewise bending moment acting on the at least one rotor blade,
a fourth base information which is representative for a flapwise bending moment acting on the at least one rotor blade,
a fifth base information which is representative for an angular acceleration of the at least one rotor blade, and,
a sixth base information which is representative for an electrical power output of the wind turbine and for a wind speed at the wind turbine; and,
wherein at least one of the first trigger information and the second trigger information are determined in dependence upon at least one of the first base information, the second base information, the third base information, the fourth base information, the fifth base information, and the sixth base information.

9. The method of claim 8, wherein:
the first base information is determined in dependence upon measurements taken with help of a first sensor system, the first sensor system including at least one encoder sensor;
the second base information is determined in dependence upon measurements taken with help of a second sensor system, the second sensor system including at least one strain sensor for measuring the torsional bending moment of the at least one rotor blade;
at least one of the third base information and the fourth base information are determined in dependence upon measurements taken with help of at least one of a third sensor system and a fourth sensor system, and at least one of:
the third sensor system includes at least one strain sensor for measuring the edgewise bending moment of the at least one rotor blade;
the fourth sensor system includes at least one strain sensor for measuring the flapwise bending moment of the at least one rotor blade;
the fifth base information is determined in dependence upon measurements taken with help of a fifth sensor system, the fifth sensor system including at least one acceleration sensor for measuring the acceleration of the at least one rotor blade; and,
the sixth base information is determined in dependence upon measurements taken with help of a sixth sensor system, the sixth sensor system including at least one voltage sensor and at least one current sensor and one measurement unit for measuring the wind speed at the wind turbine.

10. A computer program comprising instructions which, when the program is executed by a computer, cause the computer to carry out the method of claim 1.

11. A non-transitory, computer-readable data storage medium having the computer program of claim 10 stored thereon.

12. A control device comprising at least one processor configured to perform the method of claim 1.

13. A control system for operating a wind turbine having a wind turbine component and a setting system which is configured to execute at least two different measures for reducing a likelihood of overloading the wind turbine component, the control system comprising:
at least one sensor system configured to take measurements via which it is determinable whether the likelihood of overloading the wind turbine component exceeds a threshold;
a control device including a processor and a non-transitory computer-readable storage medium having program code stored thereon;
said program code being configured, when executed by said processor, to:
provide first trigger information which is representative of whether the likelihood of overloading the wind turbine component exceeds a first threshold;
generate a first output signal if the likelihood of overloading the wind turbine component exceeds the first threshold, wherein the first output signal is configured to cause the setting system to execute a first measure of the at least two different measures for reducing the likelihood of overloading the wind turbine component;
provide second trigger information which is representative of whether the likelihood of overloading the wind turbine component exceeds a second threshold after the first measure has been executed;
generate a second output signal if the likelihood of overloading exceeds the second threshold, wherein the second output signal is configured to cause the setting system to execute a second measure of the at least two different measures for reducing the likelihood of overloading the wind turbine component, such that the second measure is executed in the case that the first measure has not led to a sufficient reduction of the likelihood of overloading at least one wind turbine component;

said control device being signally connectable to said at least one sensor system in order to provide said control device with the measurements of said at least one sensor system; and, said control device being signally connectable to the setting system in order to provide the setting system with the first output signal and the second output signal of said control device so that the setting system executes the first measure and the second measure in dependence upon the first output signal and the second output signal.

14. A wind turbine comprising:

a wind turbine component;

a setting system configured to execute at least two different measures for reducing a likelihood of overloading at least one wind turbine component;

a control system for operating the wind turbine;

said control system including at least one sensor system configured to take measurements via which it is determinable whether the likelihood of overloading the wind turbine component exceeds a threshold;

said control system including a control device including a processor and a non-transitory computer-readable storage medium having program code stored thereon;

said program code being configured, when executed by said processor, to provide first trigger information which is representative of whether the likelihood of overloading the wind turbine component exceeds a first threshold;

generate a first output signal if the likelihood of overloading the wind turbine component exceeds the first threshold, wherein the first output signal is configured to cause the setting system to execute a first measure of the at least two different measures for reducing the likelihood of overloading the wind turbine component;

provide second trigger information which is representative of whether the likelihood of overloading the wind turbine component exceeds a second threshold after the first measure has been executed;

generate a second output signal when said first measure has not led to a sufficient reduction of the overloading of the wind turbine component and the overloading has exceeded the second threshold, wherein the second output signal is configured to cause the setting system to execute a second measure of the at least two different measures for reducing the overloading of the wind turbine component;

said control device being signally connectable to said at least one sensor system in order to provide said control device with the measurements of said at least one sensor system; and, said control device being signally connectable to the setting system in order to provide the setting system with the first output signal and the second output signal of said control device so that the setting system executes the first measure and the second measure in dependence upon the first output signal and the second output signal.

15. The wind turbine of claim 14, wherein:

the wind turbine component is a rotor blade of a rotor of the wind turbine; and, said setting system includes at least one of a pitch setting arrangement for changing the pitch angle of the rotor blade and an electrical power output setting arrangement for setting an electrical power output of the wind turbine.

* * * * *